(No Model.)  6 Sheets—Sheet 1.
P. P. CRAVEN.
TYPE SETTING MACHINE.
No. 422,122.  Patented Feb. 25, 1890.
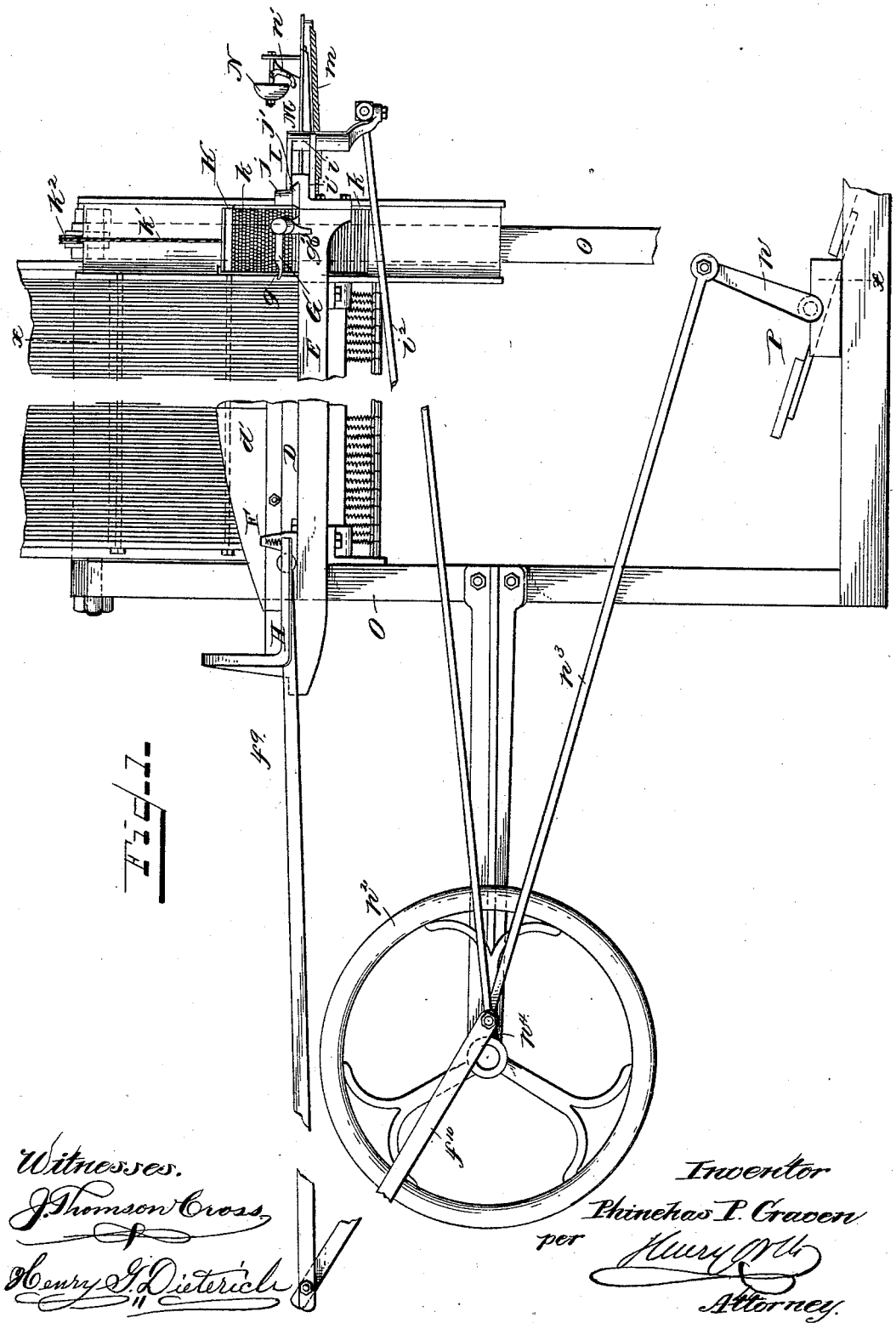
Witnesses.
J. Thomson Cross
Henry J. Dieterich
Inventor
Phinehas P. Craven
per
Henry W.
Attorney.

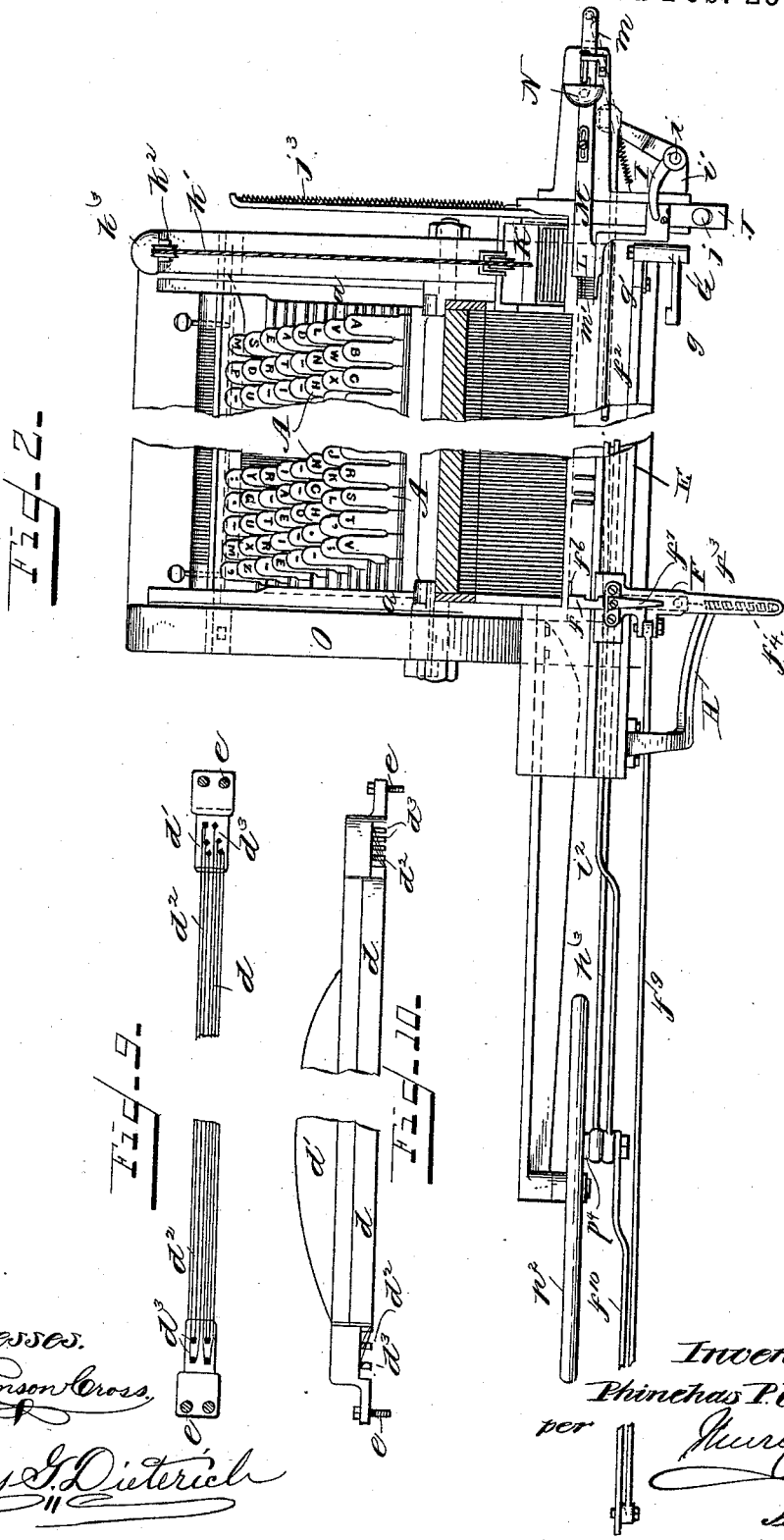

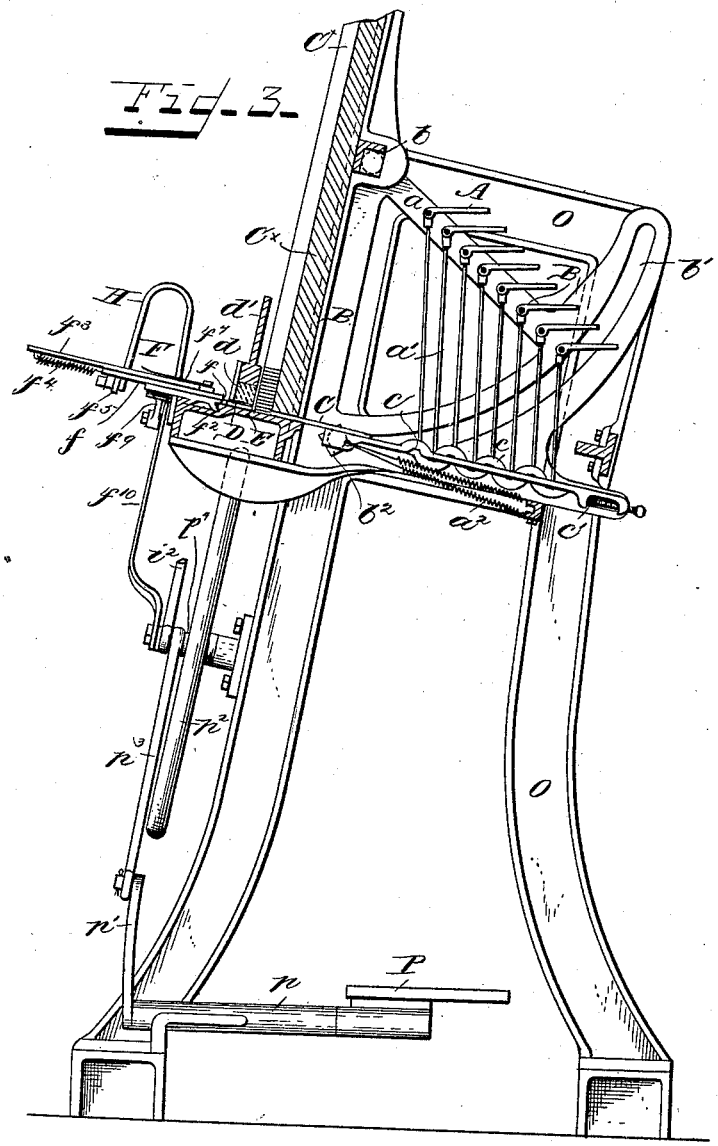

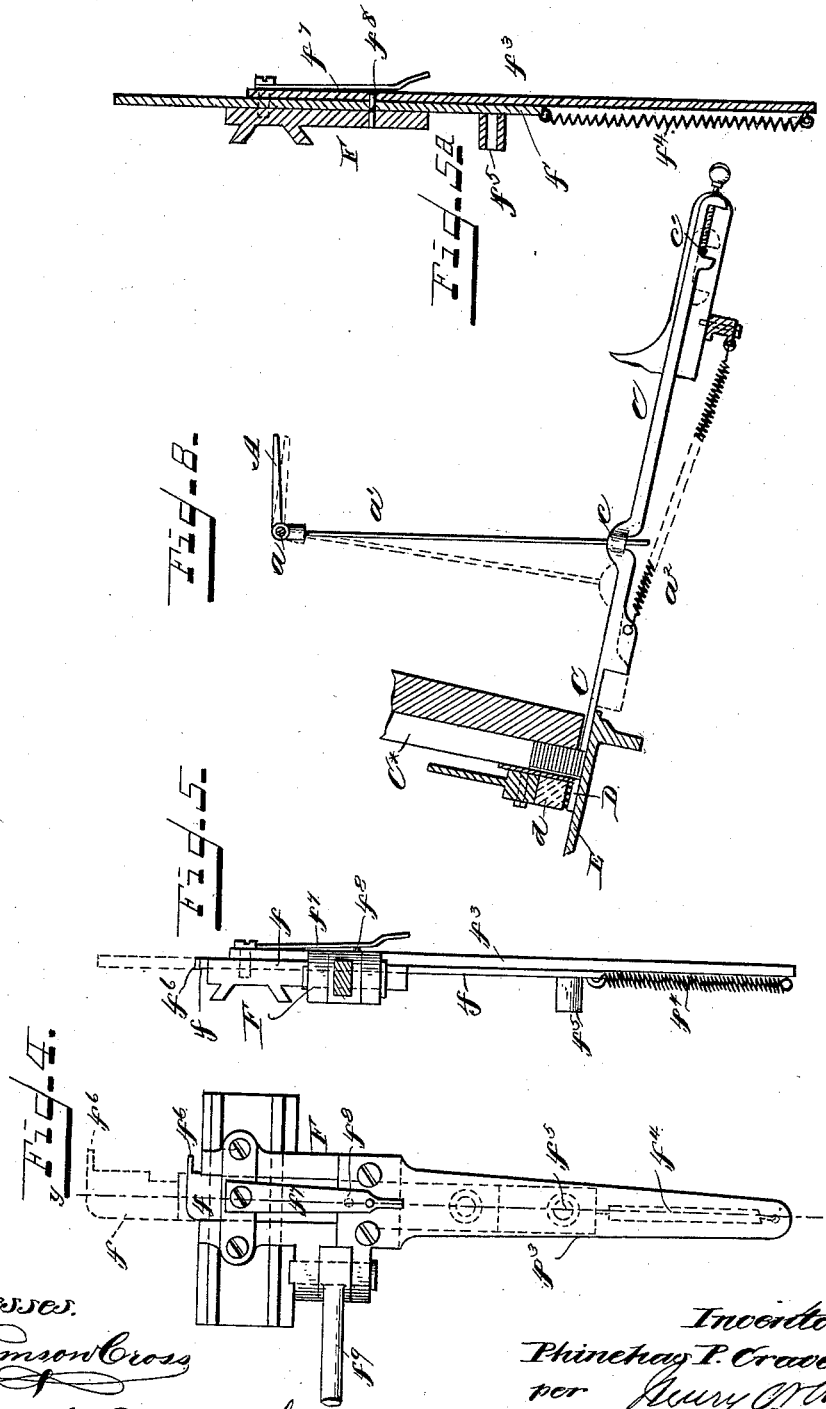

(No Model.)
P. P. CRAVEN.
TYPE SETTING MACHINE.
No. 422,122.
6 Sheets—Sheet 5
Patented Feb. 25, 1890.
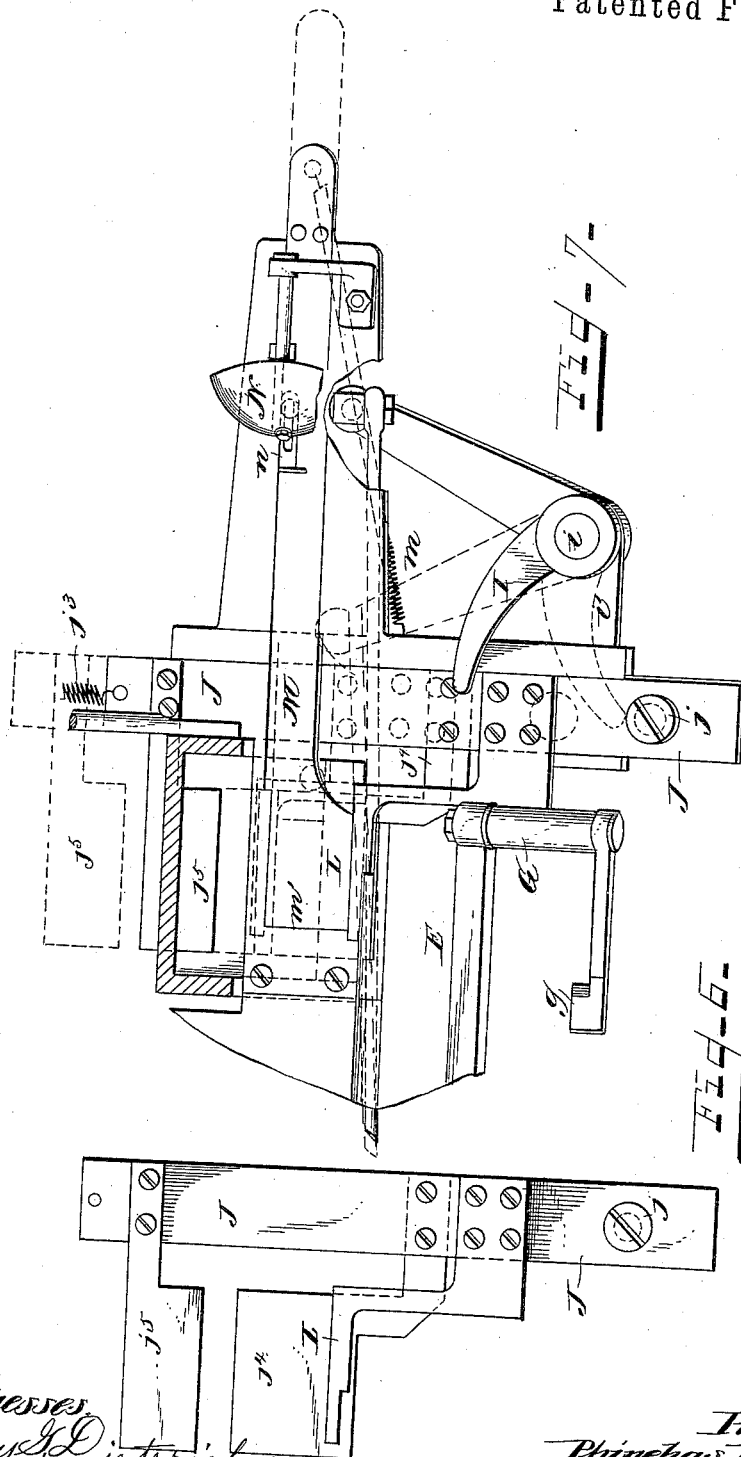
Witnesses
Henry J. Dietrich
J. Thomson Cross.
Inventor
Phineas P. Craven
per Henry Orth
Atty.

(No Model.)
P. P. CRAVEN.
TYPE SETTING MACHINE.
No. 422,122.   Patented Feb. 25, 1890.
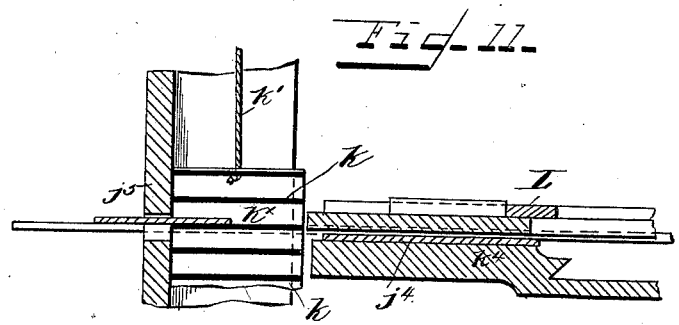
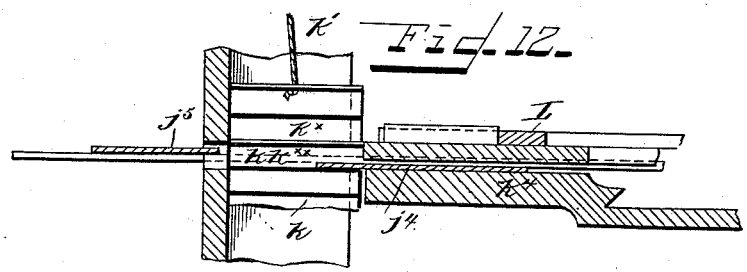
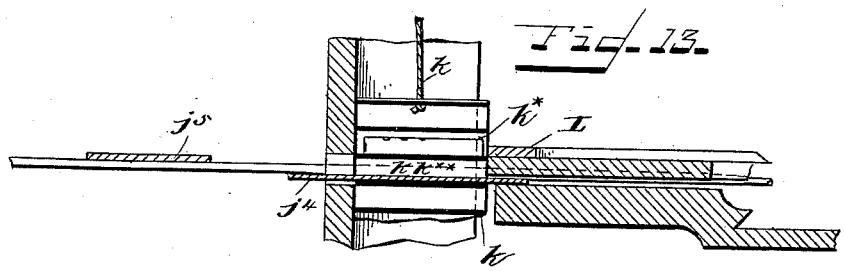
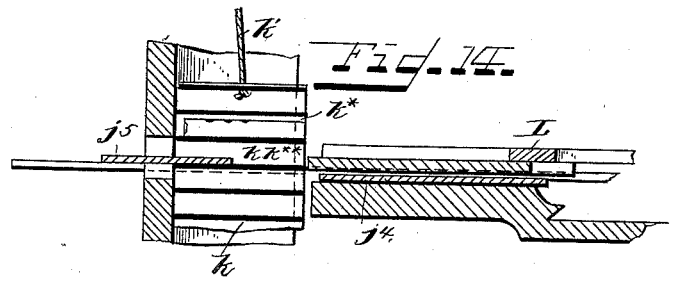
Witnesses.
J. Thomson Cross,
Henry G. Dieterich.
Inventor:
Phinehas P. Craven,
per Henry Orth
Att'y.

UNITED STATES PATENT OFFICE.

PHINEHAS PEARSON CRAVEN, OF WEST BRUNSWICK, NEAR MELBOURNE, VICTORIA.

TYPE-SETTING MACHINE.

SPECIFICATION forming part of Letters Patent No. 422,122, dated February 25, 1890.

Application filed May 23, 1889. Serial No. 311,907. (No model.) Patented in Victoria November 21, 1885, No. 4,321; in New South Wales April 18, 1888, No. 623; in South Australia April 19, 1888, No. 1,006; in New Zealand April 26, 1888, No. 2,949, and in Queensland August 24, 1888, No. 458.

*To all whom it may concern:*

Be it known that I, PHINEHAS PEARSON CRAVEN, gentleman, a subject of the Queen of Great Britain, residing at Park street, West Brunswick, near Melbourne, in the British Colony of Victoria, have invented a new and useful Improved Type-Setting Machine, (for which I have obtained a patent in the following British Colonies, namely: in Victoria, patent dated the 21st day of November, 1885, and numbered 4,321; in New South Wales, patent dated the 18th day of April, 1888, and numbered 623; in South Australia, patent dated the 19th day of April, 1888, and numbered 1,006; in New Zealand, patent dated the 26th day of April, 1888, and numbered 2,949, and in Queensland, patent dated the 24th day of August, 1888, and numbered 458,) of which the following is a specification.

This invention consists of an improved type-setting machine which, when provided with columns of type of the description and character required, will, by actuating the keys of a finger-board, simultaneously compose the type and set them in lines within a column-case in proper order for their being justified prior to their use in the printing-machine. This is accomplished by the operator in the first place pressing down the proper keys of a finger-board to force out into a longitudinal race the type-letters which are to compose the words. Then, on driving the machine by suitable power—say by actuating a pedal or pedals—the type are pushed together in the said longitudinal race and are placed and packed at the end of the machine against a certain trigger or releasing arrangement, hereinafter described, until sufficient type have thus been packed to form a row, when this trigger arrangement will be forced back far enough to release a slide, which pushes the composed line of type into horizontal spaces or divisions in a suitable column-case, which is released by a certain movement, hereinafter described, and is raised intermittingly to be in readiness to receive the next line of composed type. These motions are carried on simultaneously, so that as one set of words is being composed the previously-composed row is being slid along and arranged within the column-case, and the device which so places the type then works back to be in readiness to similarly treat the next set of type. In some cases the type placed in the column-case will require to be justified so as to regularly space the words within it.

In my machine the terraced key-board is supported at the top of a suitable frame, and at its rear, resting upon a horizontal plate or shelf, is arranged a type case or cabinet having a number of vertical grooves. This type case or cabinet inclines slightly toward the finger-board, and in its grooves or channels are distributed the columns of type to be used, so that by pressing down one of the keys the lowest type of the column corresponding with such key is forced out by a pusher-bar connected to said key. The said bar is returned to its normal position by the aid of a spring. The horizontal plate or shelf upon which the type case or cabinet rests is in the same plane with the bottom of the lowest type—that is, the said lowest type of each column rests upon it—and along this horizontal race-plate works a carrier having a sliding finger-bar, which carries the ejected type along said horizontal race-plate. Above this plate or shelf is arranged a bar having wires strained over the under surface thereof, and preferably having a backing of india-rubber or other similar material, the said bar being arranged at a convenient distance above said horizontal plate, so as to allow the ejected type to be pushed along what is hereinafter referred to as the "race." I prefer to use a backing of india-rubber to the wires constituting the top of this horizontal race, because without such backing I can only set up two type at a time; but with it I can set up more than two. It is therefore to be understood that if I choose I may use the wires alone, although I prefer to use them with an india-rubber backing, as already stated. The sliding finger-bar above mentioned is so arranged as that it automatically fixes itself at the beginning of its stroke in position to engage with and slide the type along, and, having done this, a catch thereon is released and the said sliding bar is drawn out by a spring, so that it is clear of the type on its return-stroke. A sliding arrangement is located at the end of the horizontal plate or race to force the line of type onto the shelves of the column-case, and this sliding arrangement is provided with a device which allows said column-case to move upward intermittingly with each complete stroke of said sliding arrangement.

I am enabled by my invention to set up several letters—say, for instance, a whole word—at once by providing several sets of the more frequently recurring letters, and by arranging the keys of my machine so that a choice of letters is afforded, whereby they may be pushed into the race in the order in which they are required to be set up.

The motions of the various moving parts of the machine are preferably obtained from a pedal or pedals through the medium of suitable mechanism.

Having now generally described and ascertained the nature of my invention and in what manner the same is to be performed, I will proceed to describe the same more particularly with the aid of the accompanying drawings, in which—

Figure 1 is a rear elevation, and Fig. 2 a plan, of a type-setting machine constructed according to my invention. Fig. 3 is a vertical transverse section on line $xx$, Fig. 1. Fig. 4 is a plan, and Fig. 5 a side elevation, of the type-carrier for conveying the type along the race to its position opposite the column-case. Fig. 5$^a$ is a section taken on line $yy$ of Fig. 4. Fig. 6 is a plan of the device that pushes the line of composed type onto one of the shelves of the column-case, and which also allows said case to rise intermittingly into position to receive the next line. Fig. 7 is a plan of the mechanism situated at the end of the back frame for releasing the catch of the finger of the carrier, for ringing an alarm-bell, for pushing the composed line of type into the column-case, and for allowing said case to travel up intermittingly into position to receive the next line of type. Fig. 8 is a detail view illustrating the construction and arrangement of the keys, pusher-bars, and race. Figs. 9 and 10 are a plan of the under side and a side elevation, respectively, of the pressure-plate which I provide over the hereinbefore-mentioned horizontal race. Figs. 11, 12, 13, and 14 are diagrammatic views illustrating the operation of the device for allowing the column-case to travel up intermittingly into position to receive a fresh line of composed type.

In the figures, A A represent the keys, which are formed with an eye or bearing at their ends to support them on rods $a$, secured in the top swinging frame B of the machine. Each key has an arm $a'$ secured to it, which at its lower end passes into an eye $c$ in one of the horizontal type-pusher bars C, whose rear ends rest on a supporting-bar $c'$. These pusher-bars and keys are returned to their normal positions by spiral springs $a^2$, each connected at one end to one of said pusher-bars and at the other to a convenient part of the top frame B of the machine.

C* represents the type cabinet or case, having a series of separate channels, in which are distributed the requisite quantity of type to be set up—one at least—and in the case of the more frequently recurring letters or characters several different channels or columns are filled, in order that the particular one may be used which will bring its letter or character in the correct order in the word being set up. This cabinet is inclined toward the finger-board to prevent the type falling out, and the bottom ends of the channels are open at the rear to allow the pusher-bars C, when actuated by their keys, to enter and force the lowest type out into the race D, the bottom of which is a solid part of the back frame-plate E, while its top is formed of a number of wires $d^2$, secured at their ends to tension-screws $d^3$, (vide Figs. 9 and 10,) screwed into the bar $d'$, which is secured to the frame-plate E by bolts $e\ e$. The purpose of these wires is to form a pliable top for the race, so that it may at any point along its length always press slightly on the edge of the type, and so prevent them canting onto their flat sides. I sometimes provide a backing of rubber or other suitable material $d$ behind these wires, as I have found in practice when employing the wires by themselves that I was only able to set up two type at once, whereas by employing this backing I am enabled to set up more than two.

The type-carrier F, having the sliding finger-bar $f$, is supported by and travels to and fro along a dovetail groove $f^2$, formed in the upper surface of the horizontal race-plate E, and the said type-carrier has an outwardly-projecting portion $f^3$, to which is secured one end of a coiled spring $f^4$, whose other end is secured to the rear end of the sliding finger-bar $f$, upon whose under side is arranged a small anti-friction roller $f^5$, for the purpose hereinafter described. The outer end of this sliding finger-bar $f$ is arrested in its backward motion by stop-pins fixed in the projecting portion $f^3$, which determine its distance of travel, and at its inner end it is furnished with a finger-point $f^6$.

$f^7$ represents a spring-catch, which is secured at one end to the carrier F and has affixed to it a pin $f^8$, which passes through a hole in said carrier and into a hole provided for it in the sliding finger-bar $f$, whereby said bar will be held out against the coiled spring $f^4$, so as to engage with and convey the type that have been ejected by the pusher-bars C along the race.

At the end of the frame-plate E is arranged a pivoted spring-trip G, whose end $g$ is held in its normal position, as shown in Fig. 1, by a small spring $g'$. The said end $g$ of this trip is so constructed and arranged that the end of the spring-catch $f^7$ passes under it in its forward movement, but in its return movement it travels over it, and so withdraws its pin $f^8$ out of engagement with its hole in the sliding finger-bar $f$, when the coiled spring $f^4$ will at once withdraw said finger-bar, so that it will on its return movement clear any type that may have been pushed into the race D. To the edge of the frame-plate E, at its other or starting end, is secured an inclined bar H, with which the anti-friction roller $f^5$ is brought into contact, so as to force the sliding finger-bar $f$ in sufficiently far for the pin $f^8$ on the spring-catch $f^7$ to enter its hole in said sliding finger-bar to retain it in its extended position, so that it will convey all the type in the race D to the other end in its forward stroke. A bent arm I is pivoted at $i$ to a lug $i'$, connected with the frame-plate E, and motion is imparted to this bent arm, as will be afterward described, so that in certain positions it comes in contact with an anti-friction roller $j$ upon a sliding plate J, Figs. 1, 2, 6, and 7. This sliding plate regulates the upward travel of the column-case K, Figs. 1, 2, 11, 12, 13, and 14, as will be hereinafter described, and it has a pusher-plate L secured on its upper surface, as shown in Figs. 6 and 7. The sliding plate J works in an undercut groove $j'$ in the frame-plate E, and its rear end is secured to a coiled spring $j^3$, whose other end is secured to the front frame of the machine. The sliding plate J is furnished with two flat tongues, one $j^4$ level with its lower and the other $j^5$ level with its upper face, and the purpose this plate serves is to allow the column-case K to rise a line-space higher after each composed line of type has been pushed into said case by a complete stroke of the pushing-in device. The said column-case consists of a metal box of a width corresponding to the column of print. It is formed with a series of partitions $k$ therein, each partition being adapted to support a line of type as set and composed. This case K is suspended by a cord or chain $k'$, which passes over a small roller $k^2$ and has attached to its other end a balance-weight $k^3$. A sliding trigger-bar M, which is held in its normal position by a spiral spring $m$, prevents the forward movement of the column-case-releasing plate J and pusher-plate L until such time as sufficient type has been packed against the end $m'$ of said trigger-bar M, when it will be pushed back by the action of the type-carrier F until it releases the sliding and pusher plates J and L. A catch $n$ on the upper face of the trigger-bar M sounds a suitable gong N by engaging with a projection on its spring-hammer $n'$ when sufficient or nearly sufficient type has been composed to fill a line in the column-case.

The type cabinet or case C*, together with the keys A, pusher-bars C, and certain few other instrumentalities, are carried upon an upper frame B, which is centered or pivoted to the main frame O of the machine at $b$, and is provided with a quadrant $b'$, through which passes a set-screw $b^2$, which is screwed into the main frame O and serves to secure the frame B at any desired inclination relatively therewith. The object of thus pivoting the upper frame B is to allow it to be swung into a horizontal or nearly horizontal position in order to facilitate the removal of an empty type case or cabinet and the substitution of a full one therefor, a further object being to enable the inclination of the said type-case to be adjusted to bring it into the position that has been found in practice to prevent the type from falling forward out of the case, while it allows them to travel smoothly and regularly down the channels as required.

The machine may be arranged to be driven by a pair of pedals P upon a shaft $p$, whose other end is provided with a crank-arm $p'$, from which a rotary motion will be transmitted to the fly-wheel $p^2$ by a connecting-rod $p^3$ through a crank $p^4$ on the spindle of said fly-wheel. From this crank an oscillating movement is imparted to the curved bar I through the rod $i^3$, and the carrier F is caused to travel to and fro along the race D by being connected through rod $f^9$ with an arm $f^{10}$, rigidly secured to said crank $p^4$, as clearly shown in Fig. 1.

The operation of my improved type-setting machine is as follows: The various descriptions and characters of type are first distributed in their respective channels or columns in the type-cabinet, either by hand or by means of a distributing-machine such as the one which forms the subject-matter of an application for Letters Patent contemporaneous with this present application. This type-cabinet being arranged in position at the back of the key-board, the keys of which are lettered to correspond with the type in the channels or columns with which they are connected, it follows that, if the operator or compositor presses down those keys which will deliver to the race the necessary type to form the words, spaces, &c., required, they will be packed in their proper order against the end of the trigger-bar M, and will eventually be pushed into the column-case in lines of a certain prearranged length, the reason being that if one of the keys A be depressed its arm $a'$ will carry the pusher-bar C forward, so that it will push the lowermost type in the column with which it is connected into the race D, which is level with the bottom of the cabinet and is practically arranged at right angles to it. When the keys are released, the springs $a^2$ return them and their pusher-bars to their normal position—that is, with the pusher-bar back clear of the type in the cabinet—so as to allow the column of type to fall or gravitate to the bottom ready for its lowermost one to be again forced out by the pusher-bar. The operator, simultaneously with pressing the keys, works the pedal, and so imparts motion through the mechanism hereinbefore described to the type-carrier F, which starts its forward stroke with its anti-friction roller $f^5$ at the top end of the inclined bar H. Consequently the sliding finger-bar $f$ is locked out to a position just sufficient to clear the front of the type-cabinet by the pin $f^8$ of the spring-catch $f^7$, so that when the carrier travels the forward edge of its finger-bar will come into contact with such of the type as have been ejected. The finger-point $f^6$ of the sliding finger-bar passes to the back and lower end of the type to prevent them from rubbing against the face of the type-cabinet while they are being conveyed to the other end of the race. As the carrier approaches the end of its stroke the end of the spring-catch $f^7$ passes under the side tail $g$ of the spring-trip G; but on its return movement the end of the spring-catch $f^7$ will travel over the top of the side tail $g$ of the trip G, and so the pin $f^8$ will be withdrawn from the sliding finger-bar $f$, and the coiled spring $f^4$ will immediately draw the said sliding finger-bar $f$ out far enough for it to clear on its return-stroke the type which in the meantime, perhaps, has been ejected from the channels or columns of the type-cabinet. The anti-friction roller $f^5$ then again enters the incline bar H, whereby the sliding finger-bar $f$ will be pushed out ready for a fresh operation, and it will be held in its out position by the pin $f^8$, as before. The type are packed by the carrier F against the end $m'$ of the trigger-bar M and gradually force it out against the pressure of the spiral spring $m$ until there remains a space about equivalent to six "n's," when the projecting hammer $n'$ will engage with the catch $n$ on the trigger-bar M and will sound the gong N, the object of the bell-signal being to enable the operator to adjust the composition of the words before the line is completed, which will be when sufficient type are delivered to enable the carrier (through the medium of the type) to push the end of the trigger-bar M beyond the type-pushing-in bar L, so as to allow said bar L to be immediately pulled forward together with the column-case-releasing plate J by the coiled spring $j^3$, so as to place the type in the line-spaces of the column-case K. The return motion is imparted to the pushing-in bar L by the bent arm I drawing the sliding plates J and L out far enough for the bar L to again abut against the edge of the trigger-bar M. This reciprocating motion of the type-pushing-in bar L and the sliding plate J also regulates the ascent of the column-case K, so as to bring the next line-space into position ready to receive the next line of composed type. Thus, as shown in Fig. 11, the sliding plate J, with the tongues $j^4$ and $j^5$ on it, is represented in its normal position—that is, at the commencement of its stroke.

In Fig. 12 the plate J is shown at about the center of its onward stroke, the column-case having been thereby allowed to rise to the extent of half a space, and being in position ready to receive the line of composed type which is pushed in by the onward movement of the pushing-in bar L.

In Fig. 13 the plate J is shown as having completed its forward stroke, and in Fig. 14 it is shown as having again returned to its normal position. The operation of this column-case-releasing plate J is as follows—that is to say: Assuming it to be in its normal position, as illustrated in Fig. 11, then as it is moved forward by the action of the spring $j^3$ on the trigger-bar M being withdrawn its tongue $j^5$ will be moved out of the column-case K, so that said case will be free to rise until stopped by the other tongue $j^4$, which meantime has entered the space below the one just vacated by $j^5$. The plate J on continuing its movement now commences to push the composed line of type into the space $k^*$—that is, into the one just vacated by the tongue $j^5$. On the return movement of the plate J its tongue $j^4$ will be withdrawn from the space $k\ k^{}$—that is, from the space below the one into which the composed line of type has just been pushed—and it will thereby allow the column-case to rise into position for a fresh line of composed type to be pushed into the space $k\ k^{}$, as illustrated in Fig. 14.

Having now particularly described and ascertained the nature of my invention and in what manner the same is to be performed, I declare that what I claim as my improvements in type-setting machines is—

1. In a type-setting machine, the combination, with a type-holder and push-bars operating to push the type from said holder, of a receiving table or race having a yielding or an elastic roof, substantially as and for the purposes specified.

2. In a type-setting machine, the combination, with a type-holder and push-bars operating to push the type from said holder, of a receiving table or race having a yielding or an elastic roof formed of wires stretched longitudinally along said roof, substantially as and for the purposes specified.

3. In a type-setting machine, the combination, with a type-holder and push-bars operating to push the type from said holder, of a receiving table or race having a yielding or an elastic roof formed of wires stretched longitudinally along said roof and a backing of rubber, substantially as and for the purposes specified.

4. In a type-setting machine, the combination, with the type holder or cabinet having vertical type-channels, a key-board, and push-bars connected with the keys and working in the type-channels to eject the type therefrom, of a receiving table or race provided with a yielding or an elastic roof, an extensible finger-bar adapted to reciprocate within the race to carry the type to one end thereof, and means, substantially such as described, for withdrawing the finger-bar from the race during its movement in one direction, substantially as and for the purposes specified.

5. In a type-setting machine, the combination, with the type-receiving table or race, of a finger-bar adapted to move toward and from as well as along the race, a locking device for locking the finger-bar against endwise motion, a detent adapted to operate the locking device to release the finger-bar, and a spring for imparting endwise motion to said finger-bar, substantially as and for the purposes specified.

6. In a type-setting machine, the combination, with the type-receiving table or race, a finger-bar adapted to reciprocate along the race, a support for and on which said bar is adapted to move endwise, a spring to hold the bar against endwise motion, and a locking device to hold said bar against the stress of the spring when endwise motion is imparted thereto, of an inclined plane at one end of the race operating on the finger-bar to move the same against the stress of its spring and allow the locking device to engage the bar, and a detent-arm at the opposite end of the race adapted to operate on the locking device to release the bar, substantially as and for the purposes specified.

7. In a type-setting machine, the combination, with the type-case, means for expelling the type singly therefrom, a receiving table or race for the reception of said type, and a finger-bar adapted to reciprocate along the race to carry the type to one end thereof, of a yielding abutment against which the type are pushed by the finger-bar and a signal operated by the said abutment, substantially as and for the purposes specified.

8. In a type-setting machine, the combination, with the type-receiving table or race, a finger-bar adapted to reciprocate along the race, a galley or column-case adapted to move vertically at one end of the race, and an actuating device adapted to impart a step-by-step motion to the galley, of a yielding abutment in front of the galley against which the type are set by the finger-bar, said abutment being adapted to control the operation of the galley-actuating device, substantially as and for the purposes specified.

9. In a type-setting machine, the combination, with a type-holder having open-ended vertical type-channels, a key-board, push-bars connected with the keys of the board and operating in the lower end of the type-channels, a receiving table or race for the reception of the type pushed out by the push-bar, a finger-bar adapted to move along the race and at right angles thereto, and a galley or column-case at one end of the race and adapted to move vertically, of a spring-actuated lifting-lever operating to impart to the galley a step-by-step motion, a yielding abutment against which the type are set, operating to lock and release the lifting-lever, a cam to return the lever into its normal position after being released by the abutment, a fly-wheel connected with the cam and finger-bar, and a treadle-and-crank connection with said fly-wheel, substantially as and for the purposes specified.

10. The combination, substantially as described, with the race D, the carrier F, provided with a spring-catch $f^7$, and the spring-actuated finger-bar $f$, provided with the roller $f^5$, of the inclined arm H and the spring-trip G, arranged at opposite ends of the race.

11. The combination, with the race D, the spring-actuated finger-bar $f$ and its support F, the inclined arm H and spring-trip G, arranged at opposite ends of the race, and means, substantially as described, to impart a reciprocating motion to the finger-bar and its support along said race between the arm and trip, of a gong, a spring-actuated hammer therefor, and the yielding or endwise-movable trigger-bar M, adapted to engage the hammer of the gong, substantially as described.

12. The combination, with the race D, means, substantially such as described, for carrying the type delivered onto the race to one end thereof, and the column-case K, arranged at one end of said race and connected by a cord with a weight, said column-case being partitioned off into column-sections, each column-section being provided with a slot in its lateral walls, of means for imparting a step-by-step movement to the case, consisting of the spring-actuated plate J, carrying the arms $j^4$ and $j^5$, adapted to alternately enter the slots in the column-case, substantially as and for the purposes specified.

13. The combination, with the race D, means, substantially such as described, for carrying the type delivered onto the race to one end thereof, and the column-case K, arranged at one end of said race and connected by a cord with a weight, said column-case being partitioned off into column-sections, each column-section being provided with a slot in its lateral walls, of means for imparting a step-by-step movement to the case, consisting of the spring-actuated plate J, carrying the arms $j^4$ and $j^5$, adapted to alternately enter the slots in the column-case, and mechanism for locking the spring-actuated plate against motion and returning the same into its normal position when moved out of it, consisting of the spring-actuated trigger-bar M and the lever I, adapted to engage a roller on the plate J, substantially as and for the purposes specified.

14. The combination, with the column-case K, constructed as set forth and operated by a cord and a weight, and the spring-actuated plate J, provided with the arms $j^4$ and $j^5$, the push-bar L, and roller $j$, of the spring-actuated trigger-bar M and the lever I, said parts being arranged for co-operation as described, for the purposes specified.

PHINEHAS PEARSON CRAVEN.

Witnesses:
 WILLIAM HENRY CUBLEY,
 WALTER SMYTHE BAYSTON.